Figure 1:
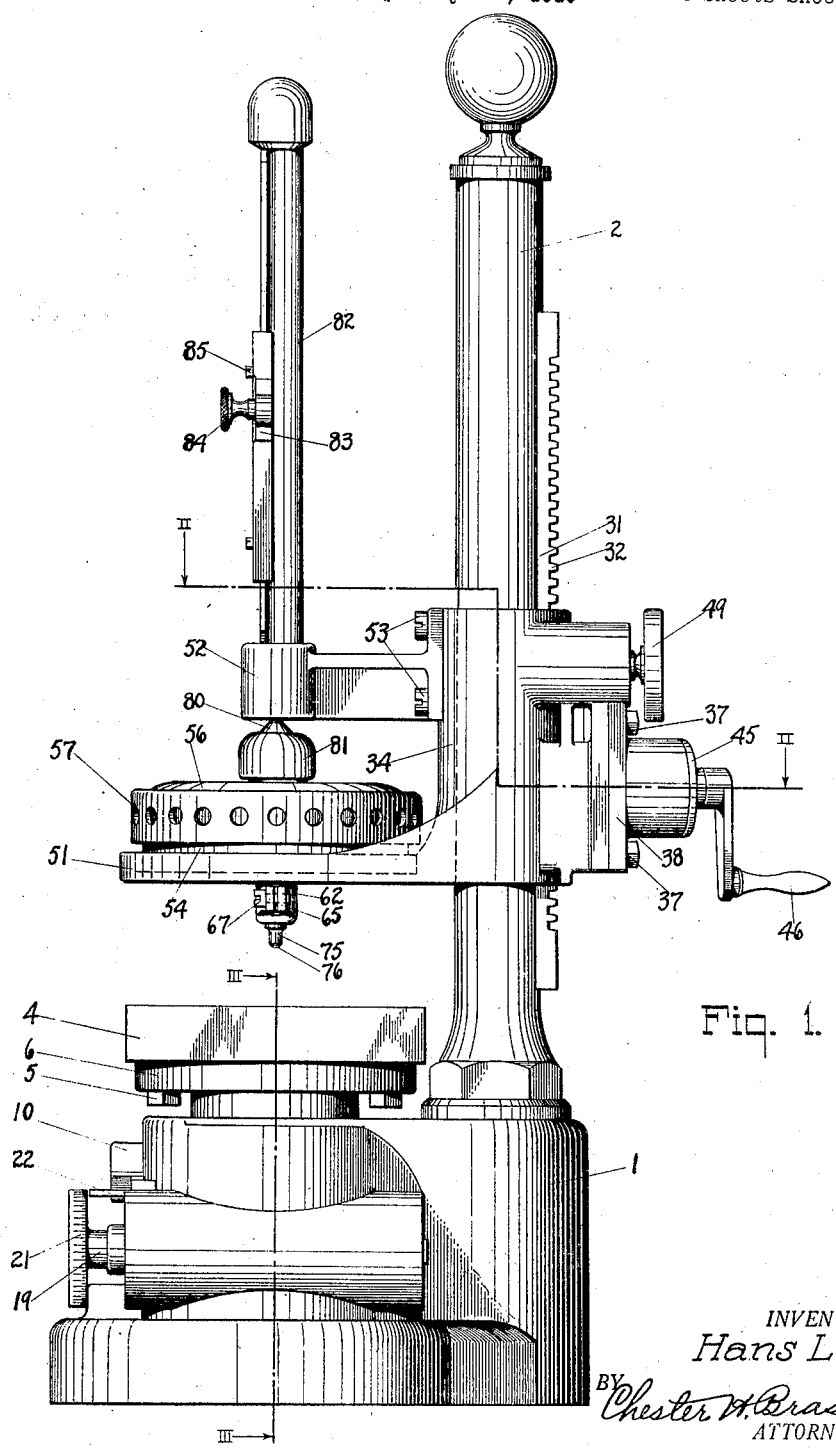

Jan. 27, 1925.

H. LUTZ 1,524,047

MEASURING INSTRUMENT

Filed May 29, 1919

4 Sheets-Sheet 1

INVENTOR.
Hans Lutz.
BY Chester H. Braselton
ATTORNEY

Jan. 27, 1925.  
H. LUTZ  
MEASURING INSTRUMENT  
Filed May 29, 1919
1,524,047
4 Sheets-Sheet 2
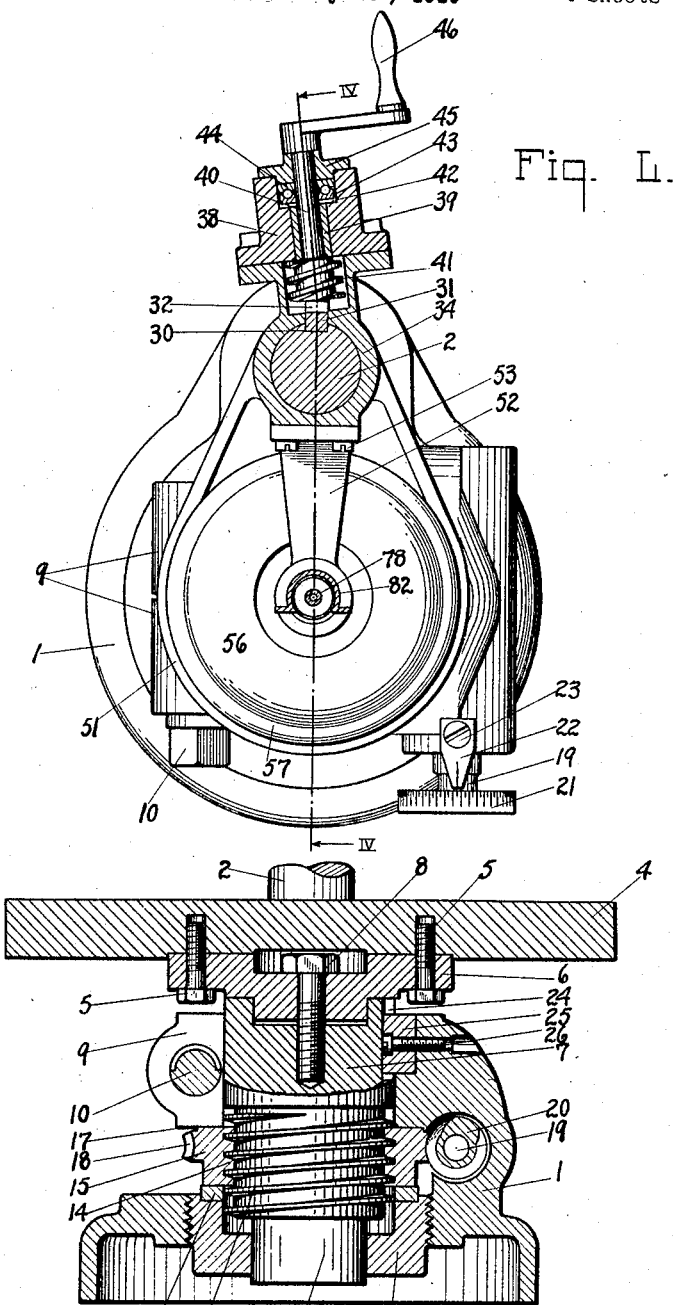
Fig. II.
Fig. III.
INVENTOR.
Hans Lutz.
BY Chester H. Braselton
ATTORNEY.

Jan. 27, 1925.
H. LUTZ
1,524,047
MEASURING INSTRUMENT
Filed May 29, 1919    4 Sheets-Sheet 3
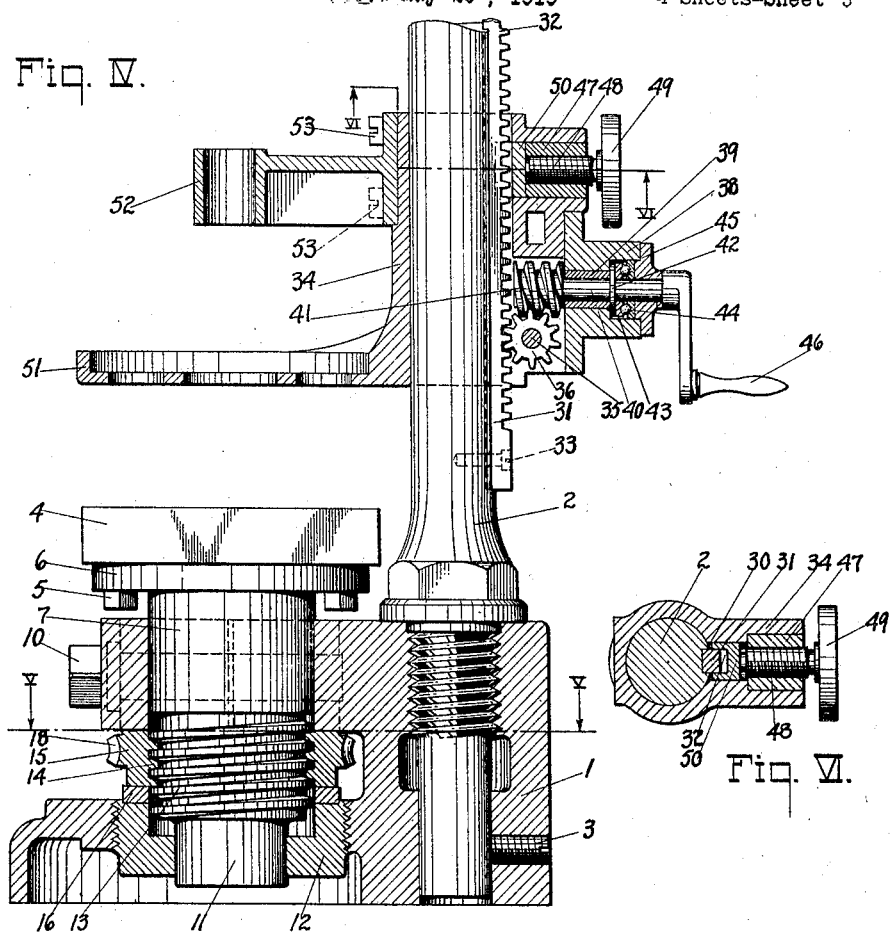
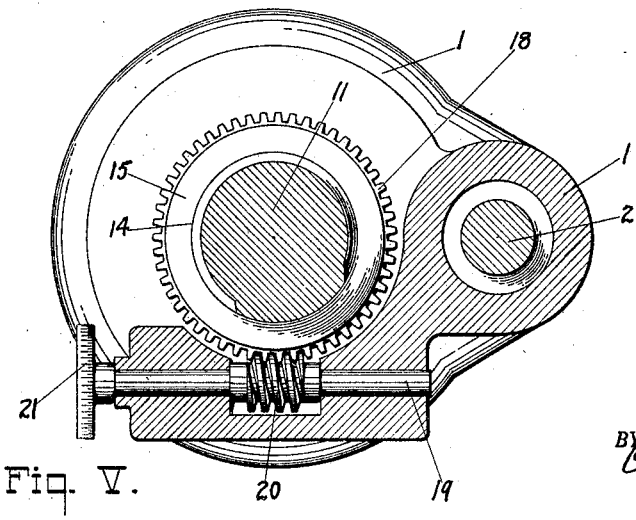
INVENTOR.
Hans Lutz.
BY Chester W. Braselton
ATTORNEY Jan. 27, 1925.
H. LUTZ
1,524,047
MEASURING INSTRUMENT
Filed May 29, 1919    4 Sheets-Sheet 4
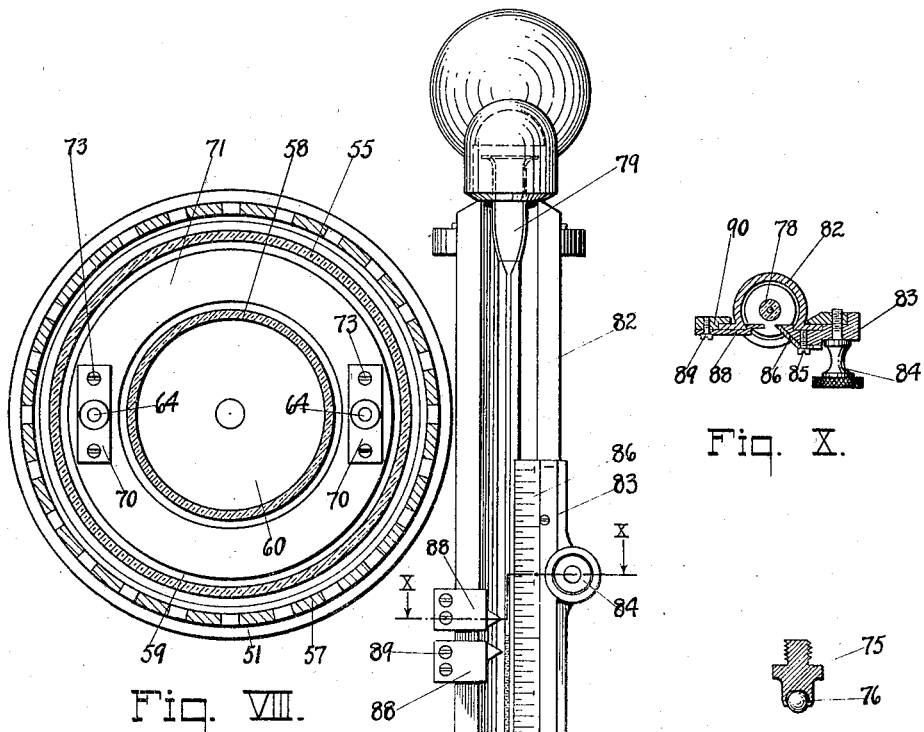
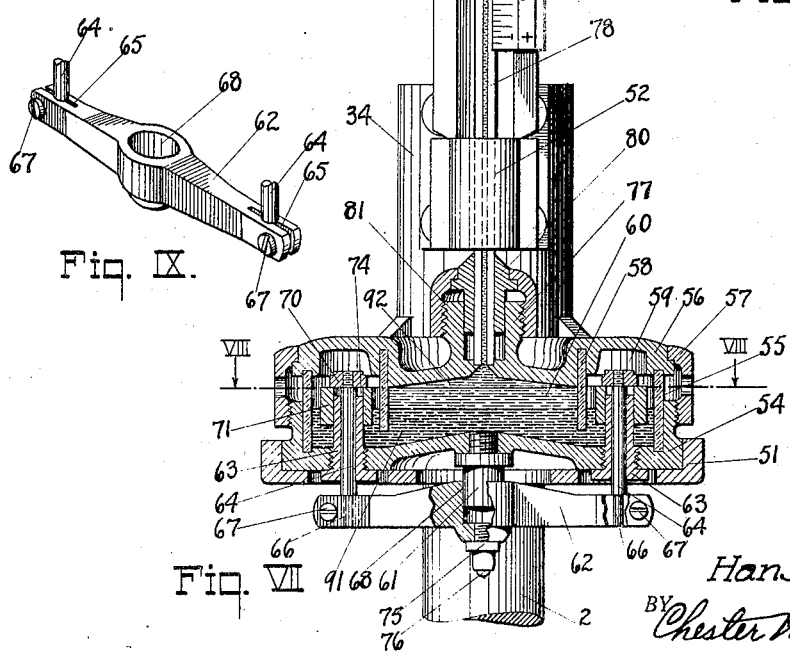
INVENTOR.
Hans Lutz
BY Chester W. Braselton
ATTORNEY Patented Jan. 27, 1925.

1,524,047

UNITED STATES PATENT OFFICE.

HANS LUTZ, OF ELMIRA, NEW YORK, ASSIGNOR TO THE WILLYS-MORROW COMPANY, OF ELMIRA, NEW YORK, A CORPORATION OF OHIO.

MEASURING INSTRUMENT.

Application filed May 29, 1919. Serial No. 300,714.

*To all whom it may concern:*

Be it known that I, HANS LUTZ, residing at Elmira, in the county of Chemung, State of New York, have invented certain new and useful Improvements in Measuring Instruments, of which I declare the following to be a full, clear, and exact description.

This invention relates to improved measuring instruments, particularly such as are adapted to be employed for the purpose of determining variations in the shape of finished articles from the true form which it is desirable that each finished article shall possess in order to produce a uniform product.

One object of the invention is to provide a device of the character described which is capable of accurately indicating slight variations in form.

A further object of the invention is to provide a device of the character described which is of simple construction and efficient in operation.

A further object of the invention is to provide a device of this character constructed in such a manner as to be capable of indicating slight variations in form of articles of varying sizes and shapes.

A further object of the invention is to provide a device of this character having a plurality of different means of adjustment which will permit it being readily adapted for use in connection with articles of different sizes and shapes.

A further object of the invention is to provide a device of this character wherein the measuring instrumentalities comprise liquids of different specific gravities.

Further objects of the invention relate to economies of manufacture and details of construction as will hereinafter appear from the detailed description to follow.

The objects of the invention are accomplished in one instance by the devices and means described in the following specification, but it is evident that the same may be varied slightly without departing from the scope of the invention as pointed out in the appended claims.

A structure constituting one embodiment of the invention, which may be the preferred, is illustrated in the accompanying drawings forming a part hereof, in which:

Figure I is a side elevational view of the measuring instrument.

Figure II is a horizontal sectional view, taken along the line II—II of Figure I and illustrating the relative position of various parts of the operating mechanism.

Figure III is a vertical sectional view, taken along the line III—III of Figure I and illustrating the relative position of the supporting member with respect to its adjusting mechanism.

Figure IV is a vertical sectional view, taken along the line IV—IV of Figure II and illustrating the relative position of the standard and supporting member with respect to the base.

Figure V is a horizontal sectional view, taken along the line V—V of Figure IV and illustrating more in detail the adjusting mechanism of the supporting member.

Figure VI is a horizontal sectional view, taken along the line VI—VI of Figure IV and illustrating the locking mechanism for retaining the vertically adjustable measuring mechanism in position relative to the standard.

Figure VII is a side elevational view partially in section, illustrating the relative position of the various parts of the measuring mechanism.

Figure VIII is a horizontal sectional view, taken along the line VIII—VIII of Figure VII and illustrating the relative position of the various parts comprising the liquid chamber.

Figure IX is a perspective view of the movable member employed for contact with one face of the article to be measured.

Figure X is a horizontal sectional view, taken along the line X—X of Figure VII and illustrating the relative position of the scale and pointers with respect to the tube support.

Figure XI is a sectional view of the removable contact member employed in connection with the movable member illustrated in Figure IX.

In measuring devices of this character it is highly desirable to provide measuring instrumentalities capable of accurately indicating extremely slight variations, since it is necessary to be able to determine variations in the shape of the finished article which are so slight as to be imperceptible except when measured by the most delicate instruments. It is necessary in the manufacture of antifriction elements and bearing members, as well as other machine parts to so construct the same that they will be accurate to a high degree, in some instances to one ten thousandth (1/10,000) of an inch or less, and in testing these devices it therefore becomes necessary to provide extremely accurate measuring instruments capable of registering slight differences and which are so constructed as to permit their being readily employed for the purpose of rapidly measuring the articles to be tested. It is also highly desirable in devices of this character to provide adjusting means whereby the measuring instrument may be readily adapted to accommodate articles differing widely in size, so that the device may be readily and easily adjusted to accurately measure articles of different size and shape.

Great difficulty has heretofore been experienced in providing measuring devices of this character which would be sufficiently accurate and readily responsive to slight variations in size so as to accurately register the same in a manner to permit the variations thus indicated being quickly and readily determined. It has been found that by means of the use of liquids of different specific gravities, which will not readily mix nor chemically affect each other, an extremely delicate indicating means is provided for indicating extremely slight variations in the height of the heavier liquid, which may be readily utilized for the purpose of accurately determining slight differences in the size of articles to be measured.

Referring to the drawings, similar reference characters designate corresponding parts throughout the several views and the sectional views are taken looking in the direction of the small arrows at the ends of the section lines.

In the embodiment of the invention illustrated herewith, 1 indicates the base portion, which may be formed of cast metal or other similar material and which serves to support the various elements of the measuring instrument. A standard 2 which may be of substantially circular cross section is threaded within an opening formed in the base 1 and extends upwardly therefrom, being adapted to be securely held against rotation with respect to the base by means of a set screw 3 threaded within the base and contacting with the lower end portion of the standard. A supporting member or table 4 is firmly secured in any desired manner as by means of a plurality of screws 5 to a base plate 6 which is in turn firmly secured to a plunger 7 in any suitable manner as by means of a screw 8. The upper end portion of the plunger 7 is mounted within a split bearing 9 which may be formed integral with the base portion 1 and a set screw 10 may be employed for firmly clamping the portions of the split bearing together in such a manner as to securely retain the plunger 7 in a variety of adjusted positions. The plunger 7 is provided with a lower reduced portion 11 which is slidably mounted within a threaded collar 12 adapted to be threaded within an opening formed in the lower portion of the base 1. The plunger 7 is provided intermediate its ends with an external thread 13 adapted to engage with an internal thread 14 formed upon the interior surface of an adjusting nut 15, the said adjusting nut being adapted to bear against the upper surface of a wear plate 16 and a shoulder 17 formed upon the base portion 1 in such a manner as to prevent vertical movement of the adjusting nut relative to the base. The adjusting nut 15 is provided with a worm gear 18 formed upon the outer circumferential face thereof and a shaft 19 rotatably mounted in bearings formed in the base portion is provided intermediate its ends with a worm 20 which is adapted to mesh with the worm gear 18 formed upon the outer circumferential surface of the adjusting nut. A graduated disc 21 is non-rotatably secured to one end of the shaft 19 and co-operates with the pointer 22 mounted upon the base portion of the instrument for the purpose of indicating the adjusted position of the plunger and the supporting member or table carried thereby. The pointer 22 may be firmly secured to the base portion of the instrument in any desired manner as by means of a screw 23. The plunger 7 is provided with a longitudinally extending groove 24 formed upon one side thereof, the said groove being adapted to receive a lug 25 positioned within a recess formed in the base portion and retained in place therein by means of a screw 26. The lug and groove co-operate to insure movement of the plunger in a direction axially thereof and prevent rotation of the plunger with respect to the base portion. Any desired relative proportion may be employed between the worm gear 18 and the worm 20 and any desired number of graduations may be placed upon the graduated disc so as to indicate the requisite degree of vertical movement of the plunger and the supporting member carried thereby upon predetermined rotative movement of the graduated disc. In the present instance the graduated disc is provided with fifty equally spaced graduations and the parts are so proportioned as to result in a vertical movement of the supporting member through one ten thousandth (1/10,000) of an inch upon the graduated disc being turned through one of its graduated parts.

It will be understood from the above description that the supporting member or table is firmly and rigidly secured to the upper end portion of the plunger in such a manner as to be movable therewith at all times and the plunger is capable of being adjusted vertically a predetermined distance, the amount of which will be indicated by the graduated scale formed upon the edge of the disc 21. By means of the lug 25 within the longitudinal groove 24 formed upon the outer surface of the plunger, rotative movement of the plunger relative to the base portion is prevented and the plunger is limited to movement in a direction axially thereof. When the plunger is adjusted to the desired position it is capable of being firmly locked therein by a slight turning movement of the screw 10 which serves to bring the inner surface of the split bearing into close contact with the outer surface of the plunger and securely retain the same in position.

The upright standard 2 is provided with a groove 30 extending longitudinally thereof, and a toothed rack 31 is adapted to be positioned within the groove 30 and extend outwardly therefrom, being firmly secured in position relative to the standard in any desired manner as by means of screws 33. A slidable sleeve 34 surrounds the upright standard 2 and the toothed rack carried thereby, the sleeve 34 being adapted to slide vertically upon the upright standard but is prevented from rotation relative thereto by means of the toothed rack 31.

The sleeve 34 is provided with mechanism for vertically adjusting the same relative to the standard and for locking the same in position relative thereto, which will now be described more in detail. Mounted within the sleeve 34 is a shaft 35 which carries a pinion 36 non-rotatably secured thereto and adapted to mesh with the teeth 32 formed upon the toothed rack 31. Firmly secured to the sleeve 34 in any desired manner as by means of a plurality of screws 37 is an auxiliary casing member 38 provided with an opening formed therein within which is positioned a bushing 39. A shaft 40 is rotatably mounted within the bushing 39 and is provided at one end portion thereof with a worm 41 adapted to mesh with the pinion 36 previously described. The shaft 40 is provided with a shouldered portion 42 for preventing longitudinal movement of the shaft, the said shouldered portion 42 bearing against a shoulder 43 formed upon the auxiliary casing 38 and against an anti-friction bearing 44 interposed between the shouldered portion 42 and a cap plate 45 rotatably secured to the outer end portion of the auxiliary casing. A handle 46 is firmly secured to the shaft 40 at the outer end thereof and serves as a means for rotating the shaft together with the worm 41 carried thereby, thus providing means for rotating the pinion 36 so as to adjust the sleeve 34 relative to the upright standard.

Firmly secured within an opening formed in the sleeve 34 is an internally threaded sleeve 47 within which is rotatably mounted an externally threaded screw 48 which is provided at one end portion thereof with a disc 49 and engages at its opposite end an angular plate 50 which is adapted to frictionally contact with the upright standard and the toothed rack carried thereby for the purpose of securely locking the sleeve 34 in any of its various adjusted positions relative to the upright standard. It will be readily understood that the sleeve 34 may be positioned in a variety of adjusted positions relative to the upright standard, being capable of adjustment by rotating the shaft 40 and the worm carried thereby by means of the handle 46. The sleeve 34 may be firmly secured in any of its various adjusted position by rotating the exteriorly threaded screw 48 in such a manner as to press the angular plate 50 into contact with the upright standard. Formed integral with the sleeve 34 is an offset support 51 which is adapted to receive and properly support the base portion of the measuring mechanism. Positioned above the offset supporting member 51 and in substantially vertical alignment therewith is a guiding and supporting member 52 which assists in supporting the measuring mechanism and is adapted to be secured to the sleeve 34 by means of suitable securing devices, such as screws 53.

Mounted upon the supporting bracket 51 and retained in proper vertical position by means of the bracket 52 is the measuring and registering mechanism employed for the purpose of accurately registering variations in size of the article to be measured. This measuring mechanism comprises a liquid chamber formed in the base portion thereof, which chamber is divided by a suitable partition in such a manner as to form a pair of chambers in the upper portion thereof and an upwardly extending tube of comparatively small cross-sectional area communicates with the upper portion of one of the chambers thus provided. The base portion of the measuring mechanism comprises a cup shaped member 54 which is adapted to seat upon and be supported by the outwardly extending bracket 51. The cup shaped member 54 is of substantially circular form and is provided with an upwardly extending sleeve portion 55 preferably formed of glass or similar material, which fits snugly within the cup shape member 54 and extends upwardly therefrom, the upper surface of the cylindrical sleeve 55 being engaged by the under surface of a cap plate 56 in such a manner as to form a closed liquid chamber. An annular clamping member 57 engages a shoulder formed upon the cap member 56 and has the lower end portion thereof threaded upon the upper end of the cup shape member 54 in such a manner as to retain the cap plate 56 in close contact with the cylindrical sleeve 55 so as to form a closed liquid chamber between the cup shaped member 54, the cap plate 56 and the cylindrical sleeve 55. A second cylindrical sleeve 58 which is preferably formed of glass, has the upper end portion thereof embedded within the cap plate and extends downwardly therefrom within the central portion of the liquid chamber previously described. By means of the cylindrical sleeve 58 the liquid chamber is divided into two separate compartments throughout the upper portion thereof, one of said compartments 59 being of annular form, while the interior compartment 60 enclosed by the cylindrical sleeve 58 is of substantially circular form and is positioned centrally of the main liquid chamber. The cup shaped member 54 is provided with a threaded opening formed substantially centrally thereof within which is threaded a guide 61 having a portion thereof projecting downwardly and serving as a guide for the movable member 62 which will be more fully described hereinafter. The cup shaped member 54 is also provided with a pair of threaded openings oppositely positioned with respect to the central opening previously described and within each of these oppositely positioned openings is threaded an upwardly extending sleeve member 63. Each of the upwardly extending sleeve members 63 is provided with a central opening formed therein within which is adapted to be positioned an upwardly extending rod 64 slidably mounted within its corresponding sleeve member.

The movable member 62 previously described is provided at each end portion thereof with a split bearing 65 which is adapted to receive a reduced end portion 66 of one of the rods 64 and the reduced portion 66 of each rod is firmly clamped within the split bearing formed at one end of the movable member 62 by a suitable clamping means such as a screw 67. In this manner the rods 64 are firmly clamped to the end portions of the movable member 62 in such a manner as to form a substantially rigid structure therewith and be held firmly against movement relative thereto. The movable member 62 is provided with an enlarged opening 68 formed substantially centrally thereof, the opening 68 being of such a size as to fit snugly around the lower end portion of the guide 61 whereby the vertical movement of the movable member 62 is controlled by means of the guide 61 and the rods 64 slidable in the sleeves 63 in such a manner as to insure vertical movement of the movable member 62 and its associated parts and positively prevent one end of the movable member 62 from moving more rapidly than the other. The upper end portion of each of the rods 64 is threaded within a securing plate 70 which is in turn securely attached to the upper face of a ring member 71 by any suitable means, such as screws 73. The ring member 71 is provided at diametrically opposite points with openings 74 formed of such size as to be capable of sliding freely upon the outer surfaces of the upwardly extending sleeve members 63 thus serving as additional guiding means for insuring vertical movement of the ring member 71 in a horizontal plane and causing the same to move at all times with the movable member 62 to which the ring 71 is firmly secured by the means previously described. Removably threaded within the under surface of the movable member 62 is a downwardly extending contact member 75, which is adapted to carrying a hardened steel ball 76, positioned within a recess formed upon the lower end thereof, and the hardened steel ball 76 is adapted to contact with one surface of the article to be measured for the purpose of communicating vertical movement of the movable member 62 and the ring member 71 carried thereby.

The cap plate 56 is provided with an opening formed substantially centrally thereof which is surrounded by an upwardly extending threaded boss 77 the opening being adapted to communicate with an upwardly extending tube 78 having a comparatively small cross-sectional area and being provided with an opening 79 formed in the upper end portion thereof for the purpose of admitting liquid to the tube. The lower end portion of the tube 78 is enclosed by a gasket 80 which is secured to the boss 77 by means of an internally threaded clamping member 81 which is adapted to be threaded upon the outer portion of the boss 77 in such a manner as to hold the several parts securely in position relative to each other. The lower end portion of the tube 78 communicates with the central chamber 60 and extends upwardly therefrom in such a manner as to permit a portion of the liquid contained within the central chamber to extend upwardly within the tube 78. The tube 78 is enclosed by a substantially semi-cylindrical casing 82 which is formed in such a manner as to protect the tube 78 from injury, while at the same time permitting the height of the liquid within the tube to be readily determined.

The casing 82 carries a plate 83 vertically adjustable thereon, the said plate being capable of being firmly secured in position to the tube in a variety of adjusted positions by means of a set screw 84. Mounted upon the plate 83 in such a manner as to be adjustable therewith and secured thereto in any suitable manner as by means of a plurality of screws 85 is a graduated scale 86 the graduations of which may be spaced from each other so as to permit the indicating of variations in the height of the liquid in accordance with any desired system. One or more indicators 88 may be secured to the casing member 82 being vertically adjustable thereon and held in adjusted position by means of screws 89 and clamping plates 90 for the purpose of facilitating the determination of variations in the height of the liquid and thus readily determining the amount of variation of the articles to be measured.

The lower portion of the liquid chamber is preferably filled with a liquid of high specific gravity, such as mercury as indicated at 91 while the upper portion of the chamber 60 enclosed by the cylindrical sleeve 58 is preferably filled with a liquid of light specific gravity, and which will not react chemically with the mercury, such as alcohol. If desired the alcohol may contain coloring matter so as to permit the position of same in the tube 78 to be readily determined. It will be seen from the structure as illustrated in Fig. VII that the mercury extends throughout the entire portion of the liquid receiving chamber and that the same is maintained at a common level throughout the annular exterior chamber 59 and the interior circular chamber 60. The colored alcohol indicated at 92 rests directly upon the upper surface of the mercury within the interior chamber 60 and is prevented from passing to the exterior chamber 59 by means of the cylindrical sleeve 58 which extends downwardly from the cap plate 56 beneath the surface of the mercury. Whenever the hardened steel ball 76 is pressed upwardly by contact with the article to be measured it will be understood that the movable member 62 is correspondingly raised together with the ring 71 carried thereby which results in a consequent lowering of the surface of the mercury within the liquid chamber and a resultant lowering of the colored alcohol within the central chamber 60. By reason of the difference in the areas of the entire liquid retaining chamber, the interior chamber 60, the ring 71 and the tube 78 it will be understood that a slight variation in the movement of the ring occasioned by a correspondingly slight movement of the movable member 62 will be indicated by a considerably greater movement of the colored alcohol within the tube 78 and by properly proportioning the various areas the amount of vertical movement of the member 62 may be readily and easily determined from the movement of the colored alcohol within the tube 78. The areas of the several parts mentioned above may be varied in any desired manner so as to more definitely limit the points between which it is desired to indicate the variations in the articles to be measured. In the present instance the parts are preferably so proportioned with respect to their circular areas that a movement of 1/1000 of an inch of the movable member will result in a movement of the colored alcohol in the tube 78 to a distance of one inch. In order to secure this particular proportion the following circular areas of the various parts may be employed. The cross-sectional area of the glass tube 78 may be taken as 1, the area of the inner circular chamber 60 as 2000, the area of the ring 71 as 3000 and the area of the outer chamber 59 as 4000. It will be readily understood that from this proportioning of the parts an upward movement of the movable member 62 to the extent of 1/1000 of an inch will result in a lowering of the entire surface of the mercury to the extent of 1/2000 of an inch, which results in lowering the colored alcohol within the tube 78 to a distance of one inch. Since the scale 86 may be readily graduated in such a manner as to read for 1/20 of an inch it will be obvious that it is possible to readily read variations in size of the article to be measured as small as 1/20000 of an inch. In the computation of the amount of variation caused in the tube 78 through a given variation in the height of the ring 71 and the consequent raising or lowering of the surface of the mercury the pressure of the column of colored alcohol contained in the tube 78 may be practically disregarded since it is proposed to maintain the height of the alcohol column in this tube as substantially the same distance above the surface of the mercury during the various measuring operations.

From the above description it will be obvious that the measuring instrument shown and described herewith is capable of use in connection with a variety of different objects or articles with which it may be desired to be employed and that it is equally capable of use with objects of different sizes, since it is capable of readily being adjusted to different positions. In the use of the apparatus described herewith the article to be measured is preferably positioned upon the supporting member or table, and dependent upon its size or shape, may or may not be retained in position thereon by means of a suitable supporting cage. The sleeve which surrounds the standard 2 may first be roughly adjusted to the point where it is desired to be employed and locked in position by means of the locking mechanism previously described, whereupon any further adjustment of the parts to accommodate the articles to be measured may be secured by a vertical adjustment of the supporting member or table 4 the amount of such adjustment being readily determined if desired by means of the graduated disc 21 previously described. The sleeve 34 and the supporting member or table 4 being secured in proper position for use in connection with the particular article which it is desired to test, the article is positioned upon the supporting table and by moving the same beneath the hardened steel ball 76 any variation in the size of same will be immediately apparent upon reference to the colored alcohol in the tube 78. As previously set forth one or more indicators 88 may be employed and these indicators may be set in such a position as to mark the limits of the permissible variation in the size of the articles to be measured, thus readily indicating any excessive variations beyond the predetermined limit.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly as well as specifically.

What I claim as new and desire to secure by Letters Patent is:

1. In a measuring instrument, a body of liquid, a container therefor a relatively movable member within the container for effecting variations in the level of the body of liquid and means for multiplying such variations in such a manner as to render the same capable of being readily measured.

2. In a measuring instrument, a body of liquid, a container therefor a movable member, means partially submerged in said liquid actuated by the movable member for effecting variations in the height of the liquid, means preventing lateral displacement of said partially submerged means and means for multiplying the variations in the height of the liquid in accordance with a fixed ratio in such a manner as to render the same capable of being readily measured.

3. In a measuring instrument, a body of liquid, a container therefor a relatively movable member within the container for effecting variations in the level of the body of liquid, means for multiplying the extent of the variations thus produced, and means cooperating with the multiplying means for indicating the variations in the liquid level.

4. In a measuring instrument, a body of liquid, a container therefor means for causing variations in the height of the liquid and means comprising a body of liquid of less specific gravity than the first mentioned liquid for multiplying the extent of the variations in the height of the first mentioned liquid in such a manner as to render the same capable of being readily measured.

5. In a measuring instrument, a body of liquid, a container therefor a movable member, means within the container connected with and adapted to be actuated by the movable member for causing variations in the height of the body of liquid and means for multiplying the extent of such variations in such a manner as to render the same capable of being readily measured.

6. In a measuring instrument, a body of liquid, a container therefor a float for causing variations in the height of the liquid, a second body of liquid having a free surface of small area compared with that of the first mentioned liquid, and means for varying the height of the free surface of the second liquid an amount proportional to the variation in the height of the first liquid.

7. In a measuring instrument, a chamber containing a liquid, a movable member partially submerged in said liquid, operating means connected with said member at a plurality of points and means including a second liquid responsive to the level of said first liquid for multiplying and indicating the movement of said movable member.

8. In a measuring instrument, a movable member, a body of liquid, means partially immersed in the liquid and adapted to be actuated by the movable member for varying the height of the liquid upon movement of the movable member, and means for magnifying variations in the height of the liquid and indicating the same.

9. In a measuring instrument, a chamber, a liquid within the chamber, means partially immersed in said liquid for causing variations in the level of the liquid, and means including a liquid of less specific gravity than the first mentioned liquid for indicating variations in the level of the first mentioned liquid.

10. In a measuring instrument, a chamber, a body of liquid contained in said chamber, a tube communicating with said chamber, means partially immersed in said liquid for producing variations in the level of the liquid, and means including a second liquid a portion of which normally extends within the tube for indicating the extent in the variations of the level of the first mentioned liquid.

11. In a measuring instrument, a body of liquid, an enclosing chamber therefor, a movable member, means partially immersed in said liquid and actuated by said movable member to produce variations in the level of the liquid, and means including a second liquid of less specific gravity than said first mentioned liquid for indicating variations in the height of the first mentioned liquid.

12. In a measuring instrument, a supporting member, means for vertically adjusting the supporting member, a measuring means cooperating with the supporting member comprising a chamber enclosing a body of liquid and a member partially submerged therein, and means for adjusting the measuring means with respect to the supporting means.

13. In a measuring instrument, a base provided with a standard, a supporting member carried by the base, adjustable measuring means carried by the standard and cooperating with the supporting member comprising a chamber enclosing a body of liquid and a member partially submerged therein, and means for securing the measuring means in a variety of adjusted positions upon the standard.

14. In a measuring instrument, a movable member, a chamber containing a quantity of liquid, means comprising a float actuated by movement of the said member for varying the level of the liquid in said chamber, and means for multiplying the variations in level of the liquid, thereby facilitating the measurement of small movements of said movable member.

15. In a measuring instrument, a movable member, a chamber containing a quantity of liquid, means comprising a float actuated by movement of the said member for varying the level of the liquid in said chamber, and a second liquid of different specific gravity from said first mentioned liquid controlled by the variations in level of said first liquid for indicating the extent of movement of the movable member.

16. In a measuring instrument, a movable member, and means comprising a chamber enclosing liquids of different specific gravities and a member partially submerged in one of said liquids for indicating variations in the movement of the movable member.

17. In a measuring instrument, a pair of relatively movable members, and means actuated by one of said members comprising a chamber enclosing a body of liquid and a member partially submerged therein for indicating variations in the distance between the members.

18. In a measuring instrument, a pair of relatively movable members, and means comprising a chamber enclosing liquids of different specific gravities and a member partially submerged in one of said liquids for indicating variations in the distance between said members.

19. In a measuring instrument, a pair of relatively movable members, and means comprising a chamber enclosing a body of liquid and a member connected with one of said movable members and partially submerged in said liquid for indicating variations in the distance between the members.

20. In a measuring instrument, a pair of relatively movable members, and means comprising a chamber enclosing liquids of different specific gravities and a member connected with one of said first named members and partially submerged in one of said liquids for indicating variations in the distance between said members.

21. In a measuring instrument, comprising a pair of members one of which is capable of movement relative to the other, and means comprising a chamber enclosing a body of liquid and a member connected with one of said first mentioned elements and partially submerged in said liquid for indicating variations in thickness of objects inserted between said first mentioned members.

22. In a measuring instrument, a liquid chamber divided into separate communicating compartments, liquids of different specific gravities contained in said chamber, one of said liquids being confined to one of the compartments, and means whereby the differences in the level of one of the liquids produces a proportionate but magnified difference in the level of the other liquid.

23. In a measuring instrument, a liquid chamber divided into separate communicating compartments, a body of liquid of comparatively high specific gravity located in said chamber and extending throughout the compartments, a second body of liquid of comparatively low specific gravity confined to one of said compartments, and means whereby differences in the level of the first mentioned liquid produces proportionate but magnified differences in the level of the second liquid.

24. In a measuring device, a base having a standard, a work support on said base, means comprising a worm driven screw for raising and lowering said work support in said base, a measuring device opposite said work support carried by said standard, a rack and pinion device for raising and lowering said measuring device on said standard and means for clamping said measuring device in adjusted position.

25. In a measuring device, a movable member, a stationary member co-operating therewith, one of said members having a casing containing a liquid, a member partially immersed in said liquid and connected with said movable member and means for multiplying changes in level of said liquid due to movement of said movable member.

26. In a measuring device, a movable member, a stationary member including a casing having two interconnecting chambers containing a liquid, a member partially immersed in the liquid in one of said chambers and operatively connected with said movable member and fluid indicating means in said other chamber responsive to changes of level of said liquid.

27. In a measuring device, a stationary casing, a liquid in said casing, a movable element having a part dipping into said liquid and adapted to vary the level thereof, and means comprising a tube in communication with said casing for multiplying and indicating changes in level of said liquid.

28. In a measuring device, a stationary casing containing a liquid, a movable element having a part dipping into said liquid and adapted to vary the level thereof, a tube connected with said casing and a lighter liquid contained in said tube and in the casing above said first liquid.

29. In a measuring device, a stationary casing containing a relatively heavy liquid, a member floating therein, means carried by said floating member for moving the same vertically to displace more or less of said liquid, a tube connected with said casing and a lighter liquid resting upon said first liquid and extending into said tube for indicating changes in level of said first liquid.

In testimony whereof, I affix my signature.

HANS LUTZ.